(12) United States Patent
Tanno et al.

(10) Patent No.: US 8,444,795 B2
(45) Date of Patent: *May 21, 2013

(54) PNEUMATIC TIRE MANUFACTURING METHOD AND PNEUMATIC TIRE

(75) Inventors: Atsushi Tanno, Hiratsuka (JP); Shiro Ogawa, Osaka (JP); Akira Fujita, Fuwa-gun (JP); Tomio Yamabe, Fuwa-gun (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1117 days.

This patent is subject to a terminal disclaimer.

(21) Appl. No.: 12/334,017

(22) Filed: Dec. 12, 2008

(65) Prior Publication Data

US 2009/0159172 A1    Jun. 25, 2009

(30) Foreign Application Priority Data

Dec. 25, 2007   (JP) .................................. 2007-332393

(51) Int. Cl.
*B29C 35/00* (2006.01)

(52) U.S. Cl.
USPC ........ 156/110.1; 156/111; 156/123; 156/130; 156/137

(58) Field of Classification Search
USPC .................. 156/110.1, 111, 123, 130, 137
See application file for complete search history.

(56) References Cited

U.S. PATENT DOCUMENTS

| 3,712,362 | A | 1/1973 | Alderfer |
| 4,105,487 | A | 8/1978 | Suzuki et al. |

(Continued)

FOREIGN PATENT DOCUMENTS

| JP | 2004-163134 | 6/2004 |
| JP | 2006-44503 | 2/2006 |

(Continued)

OTHER PUBLICATIONS

Machine Generated English Translation of JP 2006-044503.
Final Office Action issued in U.S. Appl. No. 12/447,648 on Dec. 20, 2011.

*Primary Examiner* — Katarzyna Wyrozebski Lee
*Assistant Examiner* — Joshel Rivera
(74) *Attorney, Agent, or Firm* — Greer, Burns & Crain, Ltd.

(57) ABSTRACT

Provided is a pneumatic tire manufacturing method capable of improving the productivity of pneumatic tires each having surface fasteners in its tire inner surface, and of avoiding manufacturing a pneumatic tire having a deteriorated uniformity, as well as of preventing engagement elements of each surface fastener from being crushed. Also, provided is a pneumatic tire manufactured by the pneumatic tire manufacturing method. The pneumatic tire manufacturing method according to the present invention includes the steps of, in making a green tire having two-side fasteners in its tire inner surface in its tire circumferential direction, each two-side fastener including an engagement element group on both sides: covering the engagement element groups on first sides of the two-side fasteners with a protective rubber layer made of an uncured rubber; making a cylindrical first formed body on a making drum, with the two-side fasteners covered with the protective rubber layer being intermittently attached to an inner circumferential surface of the first forming body in a circumferential direction thereof with the engagement element groups on second sides of the two-side fasteners being interposed in between; bonding the first formed body to an inner circumference of an annular second formed body by compression through expanding the first formed body into a toroidal shape, and thereby making the green tire; and curing the green tire inside a mold of a curing machine while pressing the green tire from its inside by a bladder.

14 Claims, 9 Drawing Sheets

U.S. PATENT DOCUMENTS

| | | | |
|---|---|---|---|
| 5,085,942 A | | 2/1992 | Hong et al. |
| 5,380,384 A | * | 1/1995 | Tokunaga et al. .............. 156/111 |
| 2002/0022108 A1 | * | 2/2002 | Krantz et al. ................. 428/100 |
| 2011/0290395 A1 | * | 12/2011 | Tanno et al. .................. 152/450 |

FOREIGN PATENT DOCUMENTS

| | | |
|---|---|---|
| JP | A 2006-44503 | 2/2006 |
| JP | 2008272954 A * | 11/2008 |

* cited by examiner

PNEUMATIC TIRE MANUFACTURING METHOD AND PNEUMATIC TIRE

BACKGROUND OF THE INVENTION

1. Field of the Invention

The present invention relates to: a method of manufacturing a pneumatic tire having surface fasteners on its tire inner surface; and a pneumatic tire manufactured by the method. Specifically, the present invention relates to a pneumatic tire manufacturing method which improves the productivity of pneumatic tires each having surface fasteners on its tire inner surface, and which avoids manufacturing a pneumatic tire having a deteriorated uniformity, as well as which prevents engagement elements of each surface fastener from being crushed. The present invention also relates to a pneumatic tire manufactured by the manufacturing method.

2. Description of the Related Art

In a pneumatic tire, noise absorbing materials are provided to the inner surface of the tire cavity for the purpose of reducing cavity resonance. The applicant of the present invention has made a proposal on a pneumatic tire having surface fasteners each made of a resin such as nylon or polyester on the tire inner surface so that such noise absorbing materials can be attached to the tire easily (see Japanese patent application Kokai publication No. 2006-44503, for example).

Surface fasteners capable of engaging with the surface fasteners provided to the tire inner surface are also attached to the noise absorbing materials. The surface fasteners attached to the noise absorbing materials are engaged with the surface fasteners provided to the tire inner surface, respectively. This engagement scheme enables the noise absorbing materials to be easily attached to and easily detached as needed from the tire inner surface.

In general, a pneumatic tire of the foregoing type having surface fasteners on the tire inner surface is produced by curing a formed green tire having the surface fasteners beforehand adhered to its inner surface. The pneumatic tire manufacturing method includes a step of deforming a first formed body into a toroidal shape by expansion, the first formed body having been obtained by beforehand adhering an inner liner layer, a carcass layer and the like together on a making drum. In this deforming step, if the surface fasteners each made of a resin such as nylon and polyester are annularly attached to the first formed body which has not yet been deformed by expansion, the surface fasteners can not follow the posterior deformation of the first formed body by expansion, thus falling off from the green tire, since the inner periphery length of the first formed body is extended to a large extent. For this reason, such surface fasteners are attached to the green tire after the first formed body is deformed into the toroidal shape by expansion.

However, the surface fasteners need to be attached to the inner surface of the cavity of the green tire. The attachment requires meticulous work and results in a lower workability. This is a cause of decreasing the productivity. In addition, the surface fasteners are attached to the curved inner surface by hand. This manual work makes it difficult to attach the surface fasteners to the inner surface around an entire circuit of the tire evenly, and inevitably results in deteriorated uniformity.

In general, the green tire is cured in the mold while pressed from its inside by a bladder. As a result, engagement elements of each surface fastener which are exposed to the tire inner surface may be crushed by a pressing force of the bladder. For this reason, measures for this problem are required to be taken as well.

SUMMARY OF THE INVENTION

An object of the present invention is to provide a pneumatic tire manufacturing method which improves the productivity of pneumatic tires each having surface fasteners on its tire inner surface, and which avoids manufacturing a pneumatic tire having a deteriorated uniformity, as well as which prevents engagement elements of each surface fastener from being crushed. The object of the present invention is to additionally provide a pneumatic tire manufactured by the manufacturing method.

The pneumatic tire manufacturing method according to the present invention made for the purpose of attaining the foregoing object is characterized by including the steps of, in making a green tire having two-side fasteners in its tire inner surface in its tire circumferential direction, each two-side fastener including an engagement element group on both sides: covering the engagement element groups on first sides of the two-side fasteners with a protective rubber layer made of an uncured rubber; making a cylindrical first formed body on a making drum, with the two-side fasteners covered with the protective rubber layer being intermittently attached to an inner circumferential surface of the first formed body in a circumferential direction thereof with the engagement element groups on second sides of the two-side fasteners being interposed in between; bonding the first formed body to an inner circumference of an annular second formed body by compression through expanding the first formed body into a toroidal shape, and thereby making the green tire; and curing the green tire inside a mold of a curing machine while pressing the green tire from its inside by a bladder.

The pneumatic tire according to the present invention is characterized by being manufactured by the pneumatic tire manufacturing method.

The present invention is capable of avoiding falling off of the two-side fasteners from the inner circumferential surface of the first formed body while the first formed body is being deformed into the toroidal shape by expansion. That is because the present invention described above causes the first formed body to be made by intermittently attaching the two-side fasteners to the inner circumferential surface of the first formed body. Thus, the intermittent portions of the first formed body between the neighboring two-side fasteners are allowed to be stretched by following the expanding deformation of the first formed body into the toroidal shape while not obstructed by the two-side fasteners, when the first formed body is thus deformed.

Consequently, the present invention makes it possible to attach the two-side fasteners to the inner circumferential surface of the first formed body on the making drum. This makes it easy to attach the two-side fasteners thereto, and makes it possible to enhance the productivity. Concurrently, this makes it possible to easily attach the two-side fasteners to the predetermined locations on the making drum. For this reason, the present invention is capable of preventing unbalanced attachments of the two-side fasteners, and is accordingly capable of avoiding manufacturing a pneumatic tire having a deteriorated uniformity.

In addition, the present invention causes the protective rubber layer to protect, at the time of curing, the engagement element groups on the first sides of the two-side fasteners to which an attachment such as a noise absorbing material is detachably attached. For this reason, the present invention prevents the engagement element groups from being crushed by the pressing force of the bladder.

Furthermore, the present invention uses the two-side fasteners instead of an adhesive or the like. The two-side fasteners are attached to the inner circumferential surface of the first formed body by use of the engagement element groups on the second sides of the two-side fasteners. For this reason, no adhesive or the like needs to be applied to the fasteners in this attachment. Accordingly, the present invention makes it easy to attach the fasteners thereto, and thus makes it possible to enhance the productivity.

DETAILED DESCRIPTION OF THE PREFERRED EMBODIMENTS

Detailed descriptions will be provided hereinbelow for embodiments of the present invention by referring to the attached drawings.

Figure 1:
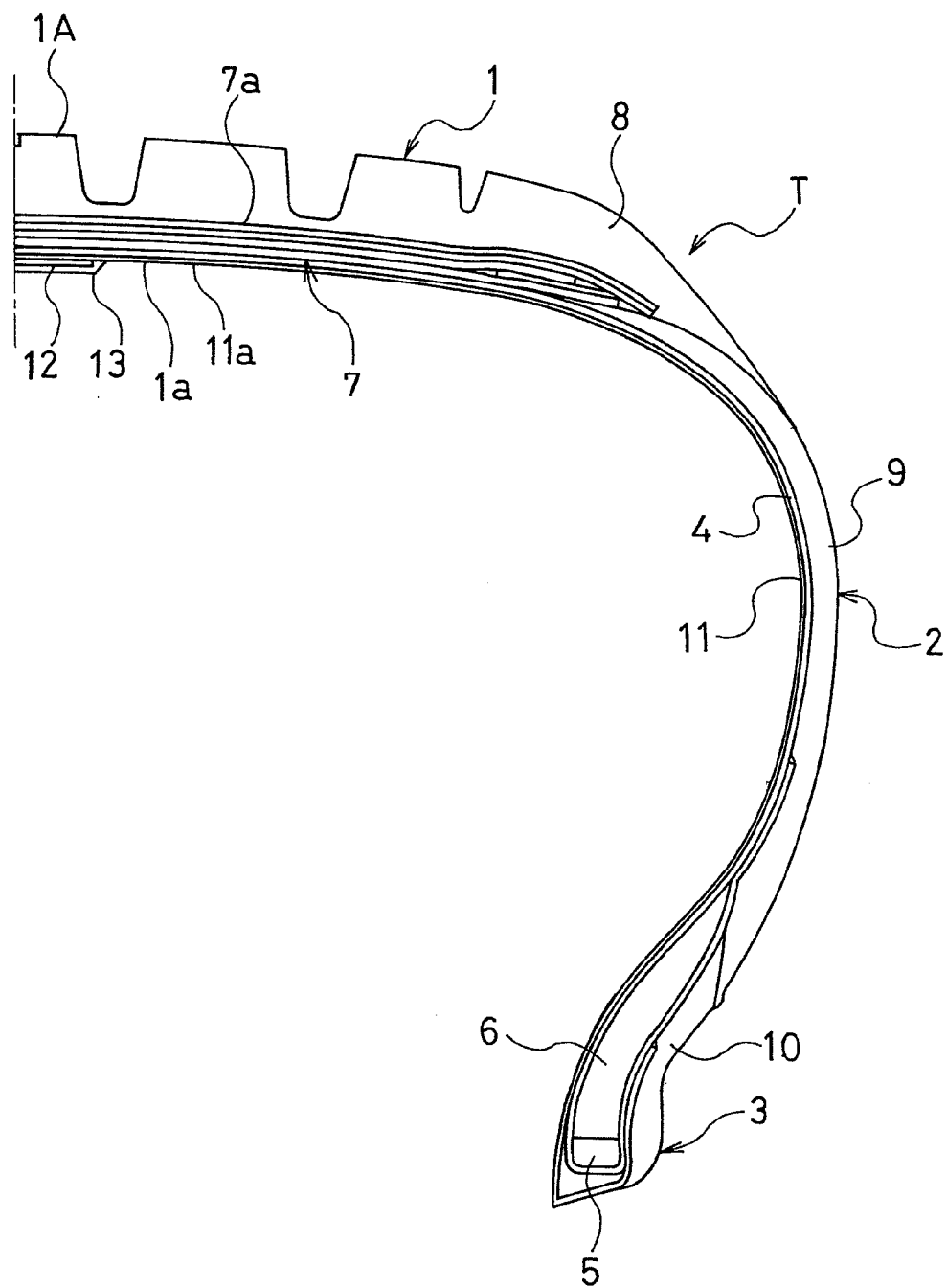
FIG. 1 is a half cross-sectional view showing an example of a pneumatic tire manufactured by a pneumatic tire manufacturing method according to the present invention.

FIG. 1 shows an example of a pneumatic tire manufactured by a pneumatic tire manufacturing method according to the present invention. Reference numeral T denotes the pneumatic tire; 1, a tread part; 2, a sidewall part; and 3, a bead part.

Inside the tire, a carcass layer 4 is extended between left and right bead parts 3. The carcass layer 4 is obtained by burying reinforcement cords in a rubber layer in a way that the reinforcement cords are arranged one after another in predetermined intervals in a tire circumferential direction. In this respect, each reinforcement cord extends in a tire radial direction. Each of the two end portions of the carcass layer 4 is folded back around a bead core 5 buried in the bead part 3 from the tire inside to the tire outside in a tire axial direction in a way that the folded-back portions of each end portion of the carcass layer 4 interpose a bead filler 6.

Multiple belt layers 7 and a belt reinforcement layer 7a are provided at the outer peripheral side of the carcass layer 4 in the tread part 1. A tread rubber layer 8 is provided at the outer peripheral side of the belt reinforcement layer 7a. A side rubber layer 9 is provided at the outer side of the carcass layer 4 in the sidewall part 2. A cushion rubber layer 10 is provided at the outer side of each folded-back portion of the carcass layer 4 in the bead part 3.

Figure 2:
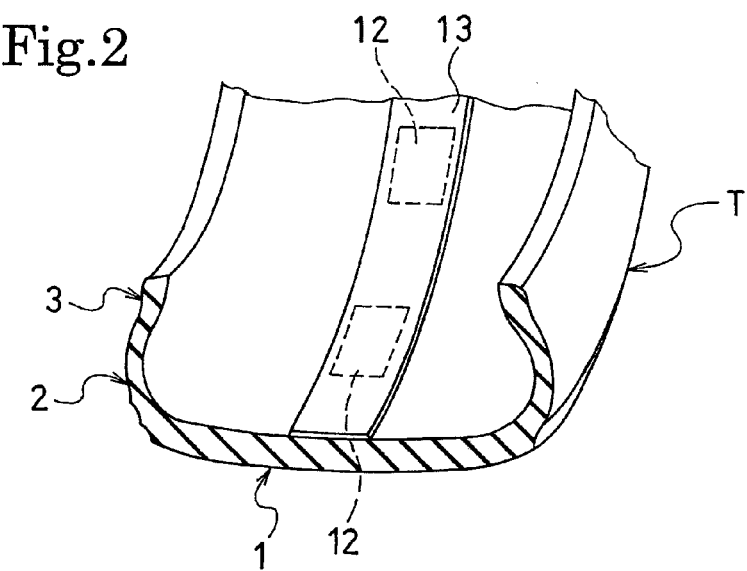
FIG. 2 is a partial and simplistic perspective view showing the pneumatic tire whose part is cut away for the purpose of showing a tire inner surface of the pneumatic tire.

An inner liner layer 11 is arranged in the inner side of the carcass layer 4. The inner liner layer 11 functions as an air-permeation preventing layer. As shown in FIGS. 1 and 2, multiple two-side fasteners 12 are intermittently attached to an inner surface 11a of the inner liner layer 11 at predetermined intervals in the tread part 1 in the tire circumferential direction. Furthermore, a belt-shaped protective rubber layer 13 is provided in an annular shape on the inner surface 11a in a way that all of the multiple two-side fasteners 12 are covered with the protective rubber layer 13.

Figure 3:
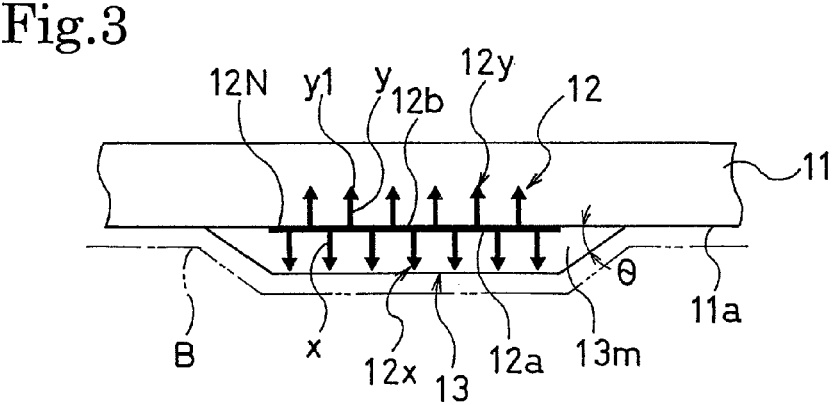
FIG. 3 is a magnified cross-sectional view schematically showing an example of a two-side fastener shown in FIG. 1.

Each two-side fastener 12 is made of a resin. As shown in FIG. 3, each two-side fastener 12 has a structure in which engagement element groups 12x, 12y are provided in the two sides of a sheet-shaped base material (a base fabric) 12N, respectively. An attachment such as a noise absorbing material (not illustrated) is detachably engaged with the engagement element group 12x on a first side 12a of each two-side fastener 12 (a first side of the base material 12N). The engagement element group 12y on a second side 12b of the two-side fastener 12 (a second side of the base material 12N) is buried in the inner liner layer 11, and thus functions as anchor elements.

Descriptions will be provided hereinbelow for a method of manufacturing the pneumatic tire T configured as shown in FIG. 1 by use of a first embodiment of the pneumatic tire manufacturing method according to the present invention by referring to FIGS. 4 to 7.

Figure 4:
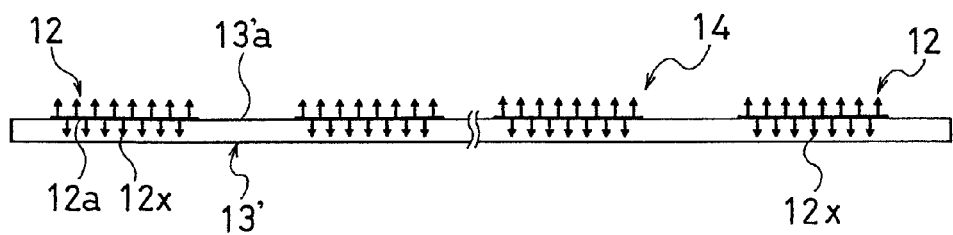
FIG. 4 is a cross-sectional explanatory view showing a step of making a protective rubber layer having two-side fasteners which is obtained by attaching the two-side fasteners to the protective rubber layer in a first embodiment of the pneumatic tire manufacturing method according to the present invention.

First of all, as shown in FIG. 4, multiple two-side fasteners 12 are intermittently attached to a first side 13'a of a belt-shaped protective rubber layer 13' made of an uncured rubber at predetermined intervals in the longitudinal direction of the protective rubber layer 13' in a way that the engagement element group 12x on the first side 12a of each two-side fastener 12 is buried in the first side 13'a of the protective rubber sheet 13'. Thereby, a protective rubber layer 14 with the two-side fasteners is formed.

It is desirable that the length of each two-side fastener 12 should be as short as possible in the longitudinal direction of the protective rubber layer as long as the length of the two-side fastener is long enough for its corresponding attachment to be attached to the two-side fastener. A portion of the protective rubber layer 14 to which each two-side fastener 12 is attached is not stretched because the two-side fastener 12 restricts the portion of the protective rubber layer 14. Consequently, when a first formed body 22 is expanded as described later, the portion of the protective rubber layer 14 restricts the expansion of the carcass layer located inward of the protective rubber layer 14. For this reason, the intermittent arrangement of the multiple two-side fasteners 12 each formed shorter in length makes it possible to check the arrangement of the reinforcement cords in the carcass layer 4 from being put out of order.

Figure 5:
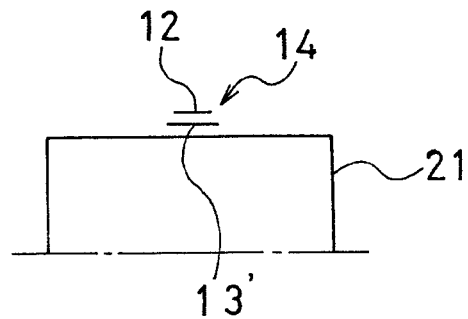
FIG. 5 is a cross-sectional explanatory view showing a step of winding the protective rubber layer having the two-side fasteners around a making drum in the first embodiment of the pneumatic tire manufacturing method according to the present invention.

Subsequently, as shown in FIG. 5, the protective rubber layer 14 with the two-side fasteners is entirely adhered onto (wound around) a making drum 21 into an annular shape with the multiple two-side fasteners 12 being located outward, and with the protective rubber layer 13' being located closer to the making drum 21.

After the protective rubber layer 14 with the two-side fasteners is adhered onto the making drum 21, an uncured inner liner 11', an uncured carcass layer 4', a bead core 5 to which an uncured bead filler 6' is attached, an uncured cushion rubber layer 10' and an uncured side rubber layer 9' are sequentially adhered onto the protective rubber layer 14 with the two-side fasteners in the same manner as a conventional type of pneumatic tire. Thereby, the first formed body 22 shaped like a cylinder is made, which has the left and right end portions being folded in the inner circumferential direction (see FIG. 6). In other words, the inner liner layer 11' is wound around the protective rubber layer 14 with the two-side fasteners in such a way as to be shaped like a cylinder with the engagement element groups 12y of the second sides 12b of the multiple two-side fasteners 12 being buried in the inner liner layer 11'. Subsequently, the other tire components constituting the first formed body 22 are adhered onto the inner liner layer 11' thus wounded. Thereby, the first formed body 22 is formed on the making drum 21.

Figure 7:
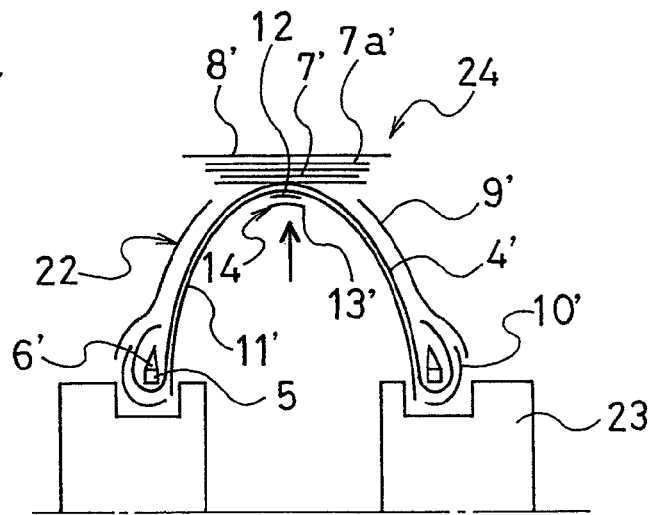
FIG. 7 is a cross-sectional explanatory view showing a step of bonding the first formed body to a second formed body by compression through expanding the first formed body in the first embodiment of the pneumatic tire manufacturing method according to the present invention.

Thereafter, the first formed body 22 is removed from the making drum 21. As shown in FIG. 7, the first formed body 22 thus removed is attached to a shaping drum 23. After that, an inflation pressure is applied to the first formed body 22 thus attached. Hence, the first formed body 22 is lifted. Thereby, the first formed body 22 is deformed into a toroidal shape by expansion. At this time, even if the inner circumferential length of the first formed body 22 is increased to a large extent, the two-side fasteners 12 do not fall off from the uncured inner liner layer 11'. That is because a rubber portion of the uncured inner liner layer 11' existing between each two neighboring two-side fasteners 12 stretches in response to the deformation of the first formed body 22 while not obstructed by the two-side fasteners 12.

The first formed body 22 thus deformed into the toroidal shape by expansion is bonded to the inner circumference of a second formed body 24 arranged in the outer circumference of the first formed body 22 by compression. In this respect, the second formed body 24 is obtained by adhering uncured belt layers 7', an uncured belt reinforcement layer 7a' and an uncured tread rubber layer 8' together, and is formed into an annular shape. The uncured tread rubber layer 8' is adhered to the outer circumference of the uncured belt reinforcement layer 7a'. Thereby, a green tire is made in which the two-side fasteners 12 are arranged on the tire inner surface in the tire circumferential direction and are covered with the protective rubber layer 13'.

Subsequently, the protective rubber layer 13' is cured by heating. Thereafter, the resultant green tire is set in a mold of a tire curing machine. After that, the green tire thus set is cured while being pressed from its inside to the mold by a bladder. At this time, the engagement element groups 12X provided to the first sides 12a of the two-side fasteners 12 for detachably attaching the attachment such as a noise absorbing material to the two-side fasteners 12 are protected by the protective rubber layer 13. For this reason, no engagement elements x of each engagement element group 12x are crushed by the pressing force of the bladder.

After its curing, the cured tire is removed from the tire curing machine. Thereby, the pneumatic tire T shown in FIG. 1 is obtained. Although the protective rubber layer 13 is attached to the pneumatic tire T shown in FIG. 1, a pneumatic tire having no protective rubber layer 13 may be manufactured by removing the protective rubber layer 13 from the cured tire depending on the necessity.

Figure 8:
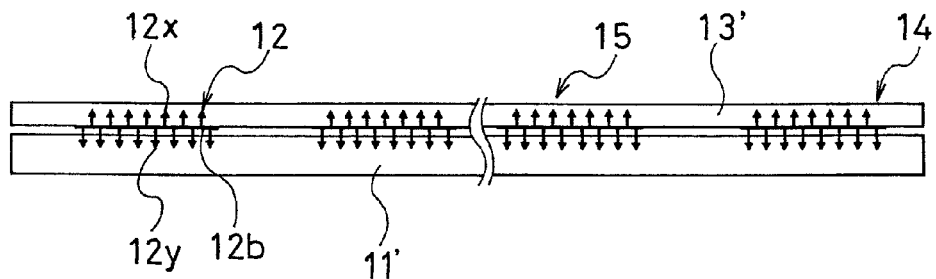
FIG. 8 is a cross-sectional explanatory view showing a way of making a green tire by making a laminated body obtained by laying the protective rubber layer having the two-side fasteners on an inner liner layer in the first embodiment of the pneumatic tire manufacturing method according to the present invention.

In this embodiment, the first formed body 22 is made by adhering the protective rubber layer 14 with the two-side fasteners to the making drum 21 and then adhering the uncured inner liner layer 11' onto the protective rubber layer 14 with the two-side fasteners. Instead, the first formed body 22 may be made as follows. The protective rubber layer 14 with the two-side fasteners is beforehand laid on the inner liner layer 11' in a way that the engagement element groups 12y on the second sides 12b of the two-side fasteners 12 are buried in the inner liner layer 11' (see FIG. 8). Subsequently, a laminated body 15 obtained by laying the protective rubber layer 14 with the two-side fasteners on the inner liner layer 11' is wound around the making drum 21 into a cylindrical shape with the protective rubber layer 13' being located closer to the making drum 21. After that, the other tire components constituting the first formed body 22 are adhered onto the laminated body 15. Thereby, the first formed body 22 is made.

As described above, in making the green tire provided with the two-side fasteners 12 on its tire inner surface in its tire circumferential direction, the present invention causes the first formed body 22 to be made by intermittently attaching the two-side fasteners 12 to the first formed body 22. For this reason, when the first formed body 22 is deformed into a toroidal shape by expansion, the rubber portion of the inner liner layer 11' between each two-side fasteners 12 attached to the inner line liner 11' is stretched by following the deformation of the first formed body 22 while not obstructed by the two-side fasteners 12. Accordingly, the present invention is capable of avoiding falling off of the two-side fasteners 12 from the inner liner layer 11'.

This makes it possible to attach the two-side fasteners 12 to the first formed body 22 on the making drum 21. For this reason, the present invention makes it easy to attach the two-side fasteners to the first formed body 22, and is accordingly capable of enhancing the productivity. In addition, the present invention makes it possible to easily attach the two-side fasteners 12 to the respective predetermined locations on the making drum 21, and is accordingly capable of preventing the pneumatic tire from deteriorating its uniformity due to unbalanced attachments of the two-side fasteners 12.

Furthermore, the present invention causes the protective rubber layer 13 to protect the engagement element groups 12x on the first sides 12a of the two-side fasteners 12 to which the attachment such as a noise absorbing material is detachably attached, while the green tire is being cured, respectively. Accordingly, the present invention is capable of preventing the engagement element groups 12x from being crushed by the pressing force of the bladder.

Moreover, the present invention uses the two-side fasteners 12 instead of an adhesive or the like. The two-side fasteners 12 are attached to the inner liner layer 11' by use of the engagement element groups 12y on the second sides 12b of the two-side fasteners 12. Thus, no adhesive or the like needs to be applied to the fasteners 12 in this attachment. Accordingly, the present invention makes it easy to attach the fasteners 12 to the inner liner layer 11', and is thus capable of enhancing the productivity further.

Figure 9:
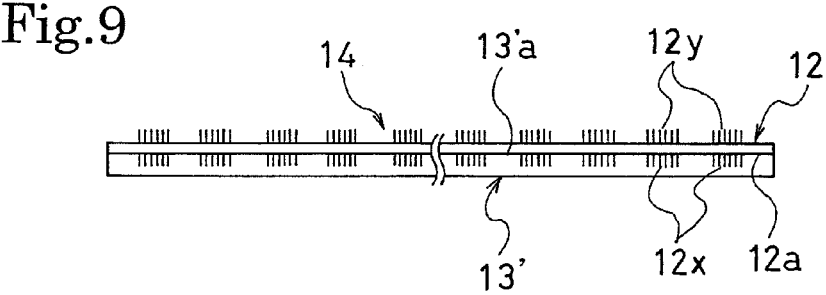
FIG. 9 is a cross-sectional explanatory view showing a step of making a protective rubber layer having a two-side fastener obtained by attaching the two-side fastener to the protective rubber layer in a second embodiment of the pneumatic tire manufacturing method according to the present invention.
Figure 10:
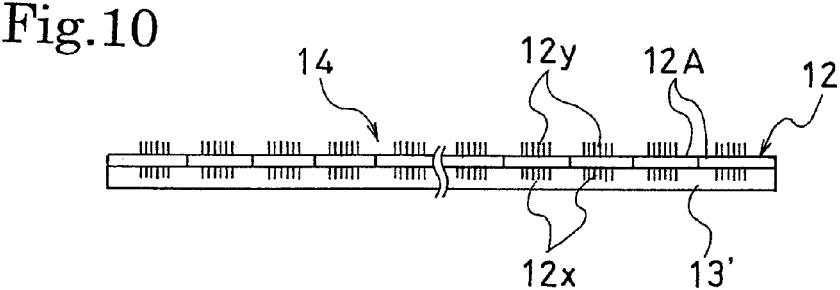
FIG. 10 is a cross-sectional explanatory view showing a step of cutting the two-side fastener in the second embodiment of the pneumatic tire manufacturing method according to the present invention.
Figure 11:
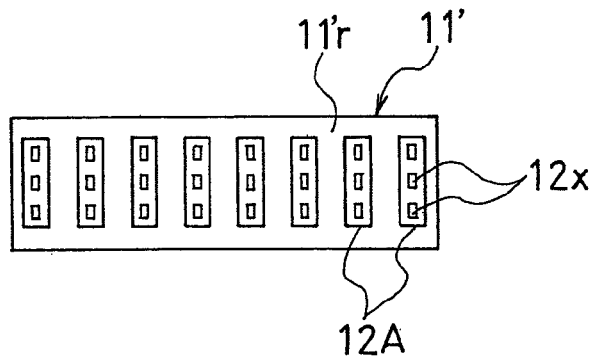
FIG. 11 is a partial explanatory view showing an inner surface of a deformed inner liner layer with the protective rubber layer being removed in the second embodiment of the pneumatic tire manufacturing method according to the present invention.

FIGS. 9 to 11 show a second embodiment of the pneumatic tire manufacturing method according to the present invention. As shown in FIG. 9, this manufacturing method causes a protective rubber layer 14 with a two-side fastener to be made by intermittently attaching a single belt-shaped two-side fastener 12 on a first side 13'a of a single belt-shaped protective rubber layer 13' made of an uncured rubber in a longitudinal direction of the protective rubber layer 13' in a way that engagement element groups 12x on a first side 12a of the two-side fastener 12 are buried in the first side 13'a of the protective rubber layer 13'. In this respect, the engagement element groups 12x are arranged on the first side 12a of the two-side fastener 12 at predetermined intervals in the longitudinal direction of the two-side fastener 12, whereas engagement element groups 12y are arranged on a second side 12b of the two-side fastener 12 at predetermined intervals in the longitudinal direction thereof.

Subsequently, as shown in FIG. 10, the belt-shaped two-side fastener 12 is cut between each two neighboring engagement element groups 12x or 12y. Thereby, the two-side fastener 12 has a constitution in which multiple two-side fastener pieces 12A are arranged. From a viewpoint of a better balance, it is desirable that the belt-shaped two-side fastener 12 should be cut in the middle between each two neighboring engagement element groups 12x or 12y.

Figure 6:
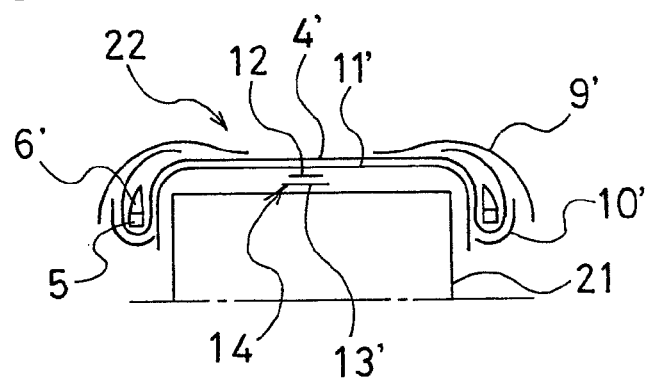
FIG. 6 is a cross-sectional explanatory view showing a step of making a first formed body by further winding other tire components around the protective rubber layer having the two-side fasteners in the first embodiment of the pneumatic tire manufacturing method according to the present invention.

Thereafter, in the same manner as are shown in FIGS. 5 to 7, the protective rubber layer 14 with the two-side fastener thus cut is wound entirely around a making drum 21 into an annular shape with the two-side fastener 12 being located outward, and with the protective rubber layer 13' being located closer to the making drum 21. Thereby, the green tire is made. When a first formed body 22 is deformed into a toroidal shape by expansion, a rubber portion 11'r of an inner liner layer 11' between each two neighboring locations in which the two-side fastener pieces 12A are attached to the inner liner layer 11' is stretched by following the expanding deformation of the first formed body 22 (see FIG. 11). For this reason, the two-side fastener 12 which is cut into the two-side fastener pieces 12A does not fall off from the inner liner layer 11'. In addition, the two-side fastener 12 is protected by the protective rubber layer 13 while the green tire is cured. Accordingly, the second embodiment is capable of offering the same effects as the first embodiment.

Figure 12:
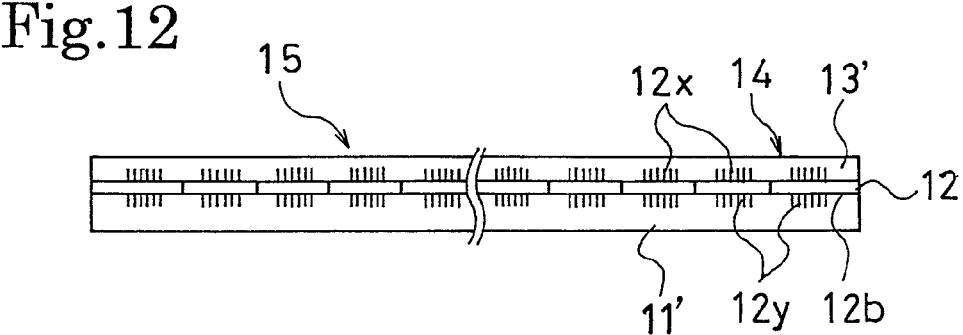
FIG. 12 is a cross-sectional explanatory view showing a way of making a green tire by making a laminated body obtained by laying the protective rubber layer having the two-side fastener on the inner liner layer in the second embodiment of the pneumatic tire manufacturing method according to the present invention.

In the case of the second embodiment, the first formed body 22 may be similarly formed as follows. The protective rubber layer 14 with the two-side fastener thus cut is beforehand laid on the inner liner layer 11' in a way that the engagement element groups 12y on the second side 12b of the two-side fastener 12 are buried in the inner liner layer 11' (see FIG. 12). Subsequently, a laminated body 15 obtained by laying the protective rubber layer 14 with the two-side fastener on the inner liner layer 11' is wound around the making drum 21 into a cylindrical shape with the protective rubber layer 13' being located closer to the making drum 21. After that, the other tire components constituting the first formed body 22 are adhered onto the laminated body 15. Thereby, the first formed body 22 is made.

Figure 13:
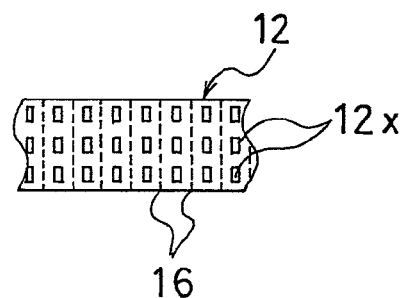
FIG. 13 is a partial plan view of a two-side fastener used in a third embodiment of the pneumatic tire manufacturing method according to the present invention.
Figure 14:
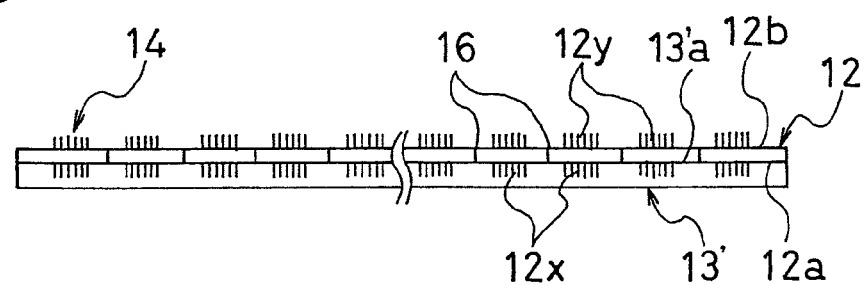
FIG. 14 is a cross-sectional explanatory view showing a step of making a protective rubber layer having the two-side fastener obtained by attaching the two-side fastener to the protective rubber layer in the third embodiment of the pneumatic tire manufacturing method of the present invention.

FIGS. 13 to 16 show a third embodiment of the pneumatic tire manufacturing method according to the present invention. As shown in FIGS. 13 and 14, this manufacturing method causes a protective rubber layer 14 with a two-side fastener to be made by use of a single belt-shaped two-side fastener 12 as follows. Engagement element groups 12x are arranged on a first side 12a of the two-side fastener 12 at predetermined intervals in the longitudinal direction of the two-side fastener 12, whereas engagement element groups 12y are arranged on a second side 12b of the two-side fastener 12 at predetermined intervals in the longitudinal direction thereof. In addition, a cut line 16 is provided between each two neighboring engagement element groups 12x or 12y. As shown in FIG. 14, this belt-shaped two-side fastener 12 is intermittently attached onto a first side 13'a of a single belt-shaped protective rubber layer 13' made of an uncured rubber in a longitudinal direction of the protective rubber layer 13' in a way that the engagement element groups 12x on the first side 12a are buried in the first side 13'a of the protective rubber layer 13'. Thereby, the protective rubber layer 14 with the two-side fastener is made.

Figure 15:
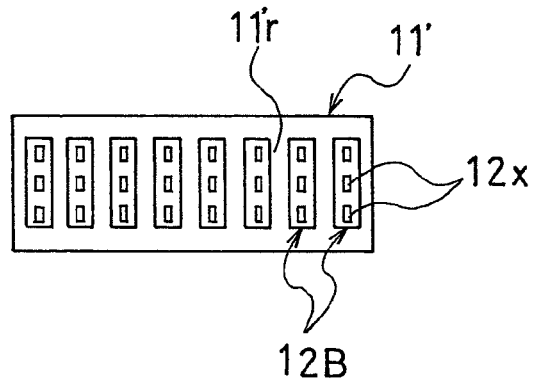
FIG. 15 is a partial explanatory view showing an inner surface of a deformed inner liner layer with the protective rubber layer being removed in the third embodiment of the pneumatic tire manufacturing method according to the present invention.
Figure 16:
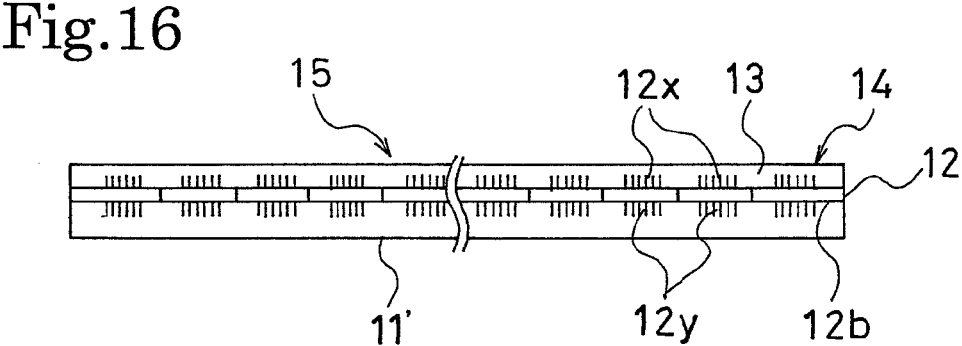
FIG. 16 is a cross-sectional explanatory view showing a way of making a green tire by making a laminated body obtained by laying the protective rubber layer having the two-side fastener on the inner liner layer in the third embodiment of the pneumatic tire manufacturing method according to the present invention.

Thereafter, in the same manner as are shown in FIGS. 5 to 7, the protective rubber layer 14 with the two-side fastener is wound entirely around a making drum 21 into an annular shape with the two-side fastener 12 being located outward, and with the protective rubber layer 13' being located closer to the making drum 21. Thereby, the green tire is made. When a first formed body 22 is deformed into a toroidal shape by expansion, as shown in FIG. 15, the belt-shaped two-side fastener 12 is cut into two-side fastener parts 12B along the cut lines 16, and a rubber portion 11'r of an inner liner layer 11' between each two neighboring locations in which the corresponding two-side fastener parts 12B are intermittently attached to the inner liner layer 11' is stretched by following the expanding deformation of the first formed body 22. For this reason, the two-side fastener 12 does not fall off from the inner liner layer 11'. In addition, the two-side fastener 12 is protected by the protective rubber layer 13 while the green tire is cured. Accordingly, the third embodiment is capable of offering the same effects as the foregoing embodiments.

In the case of the third embodiment, the first formed body 22 may be similarly formed as follows. The protective rubber layer 14 with the two-side fastener is beforehand laid on the inner liner layer 11' in a way that the engagement element groups 12y on the second side 12b of the two-side fastener 12 are buried in the inner liner layer 11' (see FIG. 16). Subsequently, a laminated body 15 obtained by laying the protective rubber layer 14 with the two-side fastener on the inner liner layer 11' is wound around the making drum 21 into a cylindrical shape with the protective rubber layer 13' being located closer to the making drum 21. After that, the other tire components constituting the first formed body 22 are adhered onto the laminated body 15. Thereby, the first formed body 22 is made.

Figure 17:
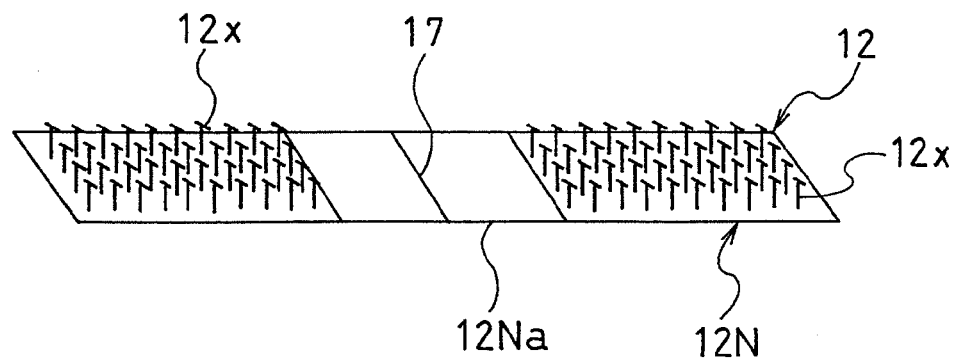
FIG. 17 is a partial perspective explanatory view of a two-side fastener used in a fourth embodiment of the pneumatic tire manufacturing method according to the present invention.
Figure 18:
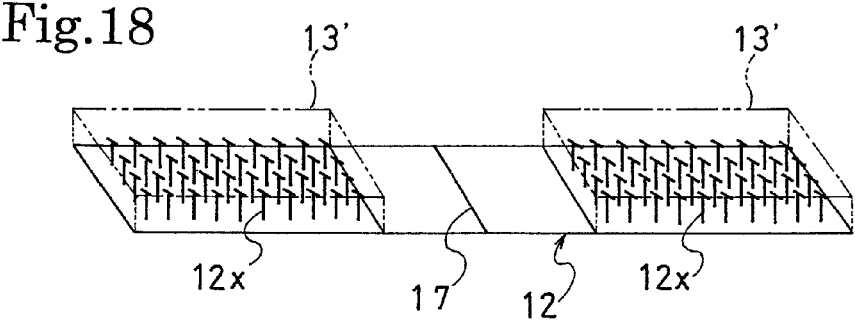
FIG. 18 is a partial perspective explanatory view showing a step of attaching a protective rubber layer to the two-side fastener in the fourth embodiment of the pneumatic tire manufacturing method according to the present invention.
Figure 19:
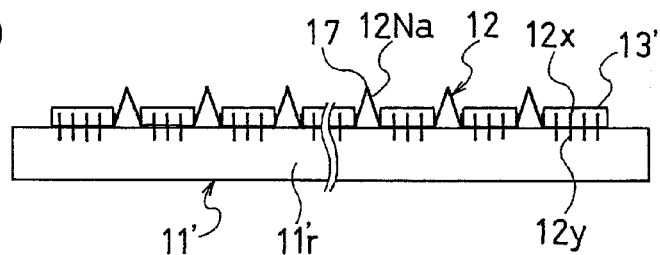
FIG. 19 is a cross-sectional explanatory view showing a step of laying the two-side fastener to which the protective rubber layer is attached on an inner liner layer in the fourth embodiment of the pneumatic tire manufacturing method according to the present invention.

FIGS. 17 to 19 show a fourth embodiment of the pneumatic tire manufacturing method according to the present invention. In this manufacturing method, a belt-shaped two-side fastener 12 is constituted as shown in FIGS. 17 and 19. Specifically, engagement element groups 12x are arranged on a first side of a base material 12N at predetermined intervals, whereas engagement element groups 12y are arranged on a second side of the base material 12N at predetermined intervals. In addition, a folding line 17 crossing the two-side fastener 12 in a width direction thereof is formed in the middle of a base material portion 12Na between each two neighboring engagement element groups 12x or 12y. Thereby, each base material portion 12Na can be folded. This belt-shaped two-side fastener 12 is longer than the inner circumferential length of a first formed body 22 which is made on a making drum 21, and is almost as long as the inner circumferential length of the first formed body 22 which is deformed by expansion.

As shown in FIG. 18, the engagement element groups 12x on the first side 12a of the belt-shaped two-side fastener 12 are respectively covered with protective rubber layers 13' made of an uncured rubber. Subsequently, as shown in FIG. 19, the two-side fastener 12 thus covered is laid on an inner liner layer 11' with the base material portion 12Na, located between each two neighboring engagement element groups 12x or 12y, being folded in a way that the engagement element groups 12y on the second side 12b of the two-side fastener 12 are buried in the inner liner layer 11'. Thereby, the two-side fastener 12 is intermittently attached to the inner liner layer 11' in a longitudinal direction thereof with the engagement element groups 12y being in between in a way that each base material portion 12Na can be stretched in response.

Subsequently, as the same manner as is described above, a laminated body 15 obtained by laying the two-side fastener 12 covered with the protective rubber layer 13' on the inner liner layer 11' is wound around the making drum 21 into a cylindrical shape with the protective rubber layer 13' being located closer to the making drum 21. Thereafter, the other tire components constituting the first formed body 22 are adhered onto the laminated body 15 thus wound. Thereby, the first formed body 22 is made. Then, a green tire is made. When the first formed body 22 is deformed into a toroidal shape by expansion, a rubber portion 11'r of the inner liner layer 11' between each two neighboring locations in which two corresponding engagement element groups are attached to the inner liner layer 11' is stretched by following the deformation of the first formed body 22. Simultaneously, a folded base material portion 12Na is stretched by following the deformation of the rubber portion 11'. For this reason, the two-side fastener 12 does not fall off from the uncured rubber sheet 13'. In addition, the two-side fastener 12 is protected by the protective rubber layer 13 while the green tire is cured. Accordingly, the fourth embodiment is capable of offering the same effects as the foregoing embodiments.

Figure 20:
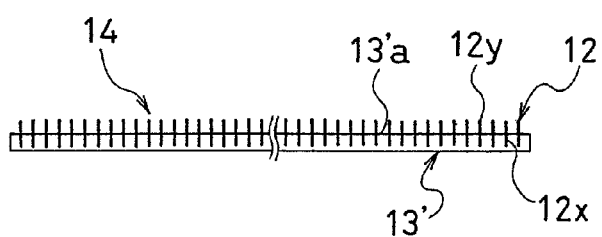
FIG. 20 is a cross-sectional explanatory view showing a step of making a protective rubber layer having a two-side fastener obtained by attaching the two-side fastener to the protective rubber layer in a fifth embodiment of the pneumatic tire manufacturing method according to the present invention.
Figure 21:
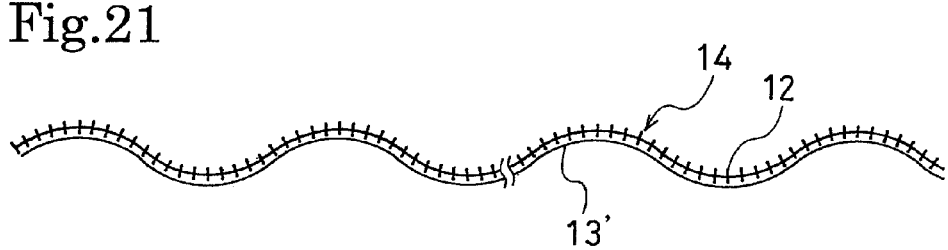
FIG. 21 is a cross-sectional explanatory view showing a step of forming the protective rubber layer having the two-side fastener into a particular shape in the fifth embodiment of the pneumatic tire manufacturing method according to the present invention.
Figure 22:
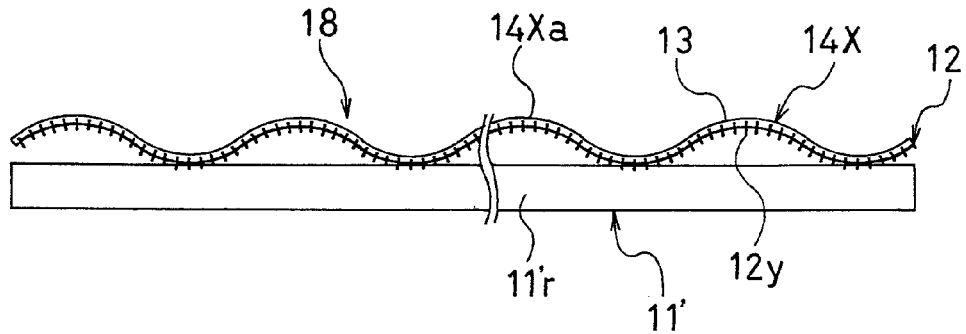
FIG. 22 is a cross-sectional explanatory view showing a step of attaching the thus-formed protective rubber layer having the two-side fastener to an inner liner layer in the fifth embodiment of the pneumatic tire manufacturing method according to the present invention.

FIGS. 20 to 22 show a fifth embodiment of the pneumatic tire manufacturing method according to the present invention. As shown in FIG. 20, this manufacturing method causes a single belt-shaped two-side fastener 12 to be attached to a belt-shaped protective rubber layer 13' made of an uncured rubber in a longitudinal direction of the protective rubber layer 13' in a way that a continuous engagement element group 12x on a first side of the two-side fastener 12 are buried in a first side 13'a of the protective rubber layer 13'. In this respect, the continuous engagement element group 12x is provided on the first side of the two-side fastener 12, whereas a continuous engagement element group 12y is provided on a second side of the two-side fastener 12. A protective rubber layer 14 with the two-side fastener which is obtained by attaching the two-side fastener 12 to the protective rubber layer 13' is longer than the inner circumferential length of a first formed body 22 which is made on a making drum 21, and is almost as long as the inner circumferential length of the first formed body which is deformed by expansion.

Subsequently, as shown in FIG. 21, the protective rubber layer 13' is cured while the protective rubber layer 14 with the two-side fastener is formed into a meandering shape in its thickness direction. Thereby, a protective rubber layer 14X with the two-side fastener formed into the meandering shape in its thickness direction (see FIG. 22) is obtained.

After that, as shown in FIG. 22, the protective rubber layer 14X with the two-side fastener thus formed is attached to an inner liner layer 11' in a way that the engagement element group 12y on the second side of the two-side fastener 12 is intermittently buried in the inner liner layer 11' at predetermined intervals.

A complex 18 obtained by attaching the protective rubber layer 14X with the two-side fastener thus formed to the inner liner layer 11' is wound around the making drum 21 into a cylindrical shape with the protective rubber layer 13 being located closer to the making drum 21. Subsequently, in the same manner as is described above, the other tire components constituting the first formed body 22 are adhered onto the complex 18. Thereby, the first formed body 22 is made. Then, a green tire is made. When the first formed body 22 is deformed into a toroidal shape by expansion, a rubber portion 11'r of the inner liner layer 11' between each two neighboring locations in which the protective rubber layer 14X with the two-side fastener thus formed is attached to the inner liner layer 11' is stretched by following the expanding deformation of the first formed body 22. Simultaneously, a meandering portion 14Xa of the protective rubber layer 14X with the two-side fastener thus formed is stretched by following the deformation of the rubber portion 11'r. For this reason, the two-side fastener 12 does not fall off from the inner liner layer 11'. In addition, the two-side fastener 12 is protected by the protective rubber layer 13 while the green tire is cured. Accordingly, the fifth embodiment is capable of offering the same effects as the foregoing embodiments.

In the case of the fifth embodiment, similarly, the first formed body 22 may be made as follows. After cured, the protective rubber layer 14X with the two-side fastener thus formed is wound around the making drum 21 into a cylindrical shape while kept formed with the two-side fastener 12 being located outward. Subsequently, the inner liner layer 11 is wound around this cylindrical protective rubber layer 14X with the two-side fastener thus formed into a cylindrical shape in a way that the engagement element group 12y on a second side 12b of the two-side fastener 12 is intermittently buried in the inner liner layer 11'. After that, the other tire components constituting the first formed body 22 are adhered onto the inner liner layer 11'. Thereby, the first formed body 22 is made.

Figure 23:
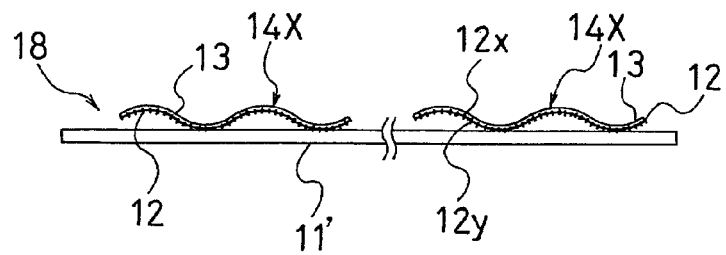
FIG. 23 is a cross-sectional explanatory view showing a way of making a green tire by use of multiple two-side fasteners in the fifth embodiment of the pneumatic tire manufacturing method according to the present invention.

The embodiment shown in FIGS. 20 to 22 uses the single belt-shaped two-side fastener 12. Nevertheless, as shown in FIG. 23, multiple two-side fasteners 12 each shorter in length may be used for the embodiment. In this case, the two-side fasteners 12 are attached to first sides 13'a of protective rubber layers 13' in a way that the engagement element groups 12x on first sides 12a thereof are buried in the first sides 13'a, respectively. Subsequently, the protective rubber layers 13' are cured while protective rubber layers 14 with the two-side fasteners which are obtained by attaching the two-side fasteners 12 to the first sides 13'a is kept formed into the meandering shape in its thickness direction. Thereby, protective rubber layers 14X with the two-side fasteners formed into the meandering shape in the thickness direction is obtained.

Thereafter, the cured protective rubber layers 14X with the two-side fasteners thus formed are attached to the inner liner layer 11' at predetermined intervals in a longitudinal direction of the inner liner layer 11' in a way that the engagement element groups 12y on the second sides of the two-side fasteners 12 in the protective rubber layers 14X with the two-side fasteners thus formed are intermittently buried in the inner liner layer 11'. Thus, a complex 18 obtained by attaching the protective rubber layers 14X with two-side fasteners thus formed to the inner liner layer 11' is made. This complex 18 is wound around the making drum 21 into a cylindrical shape with the protective rubber layers 13 being closer to the making drum 21 as described above. After that, the other tire components constituting the first formed body 22 are adhered onto the complex 18. Thereby, the first formed body 22 is made. Then, a green tire is made. This manufacturing scheme is capable of offering the same effects as the foregoing embodiments.

In the present invention, for example, nylon or polyester may be cited as the resin used for the two-side fastener(s) 12. From a viewpoint of the heat resistance, it is desirable that nylon should be used. Nylon 6, nylon 66 and their co-polymer nylon can be included in examples of such nylon.

No specific restriction is imposed on the shape and type of the two-side fastener(s) 12. The engagement elements x and y may be shaped into any form like a hook, a loop, a wedge or the like as long as the engagement elements x and y are capable of engaging with the attachment and the inner liner layer 11', respectively. In addition, it is desirable that each of the engagement elements x and y should be not less than 0.5 mm but not more than 2 mm in height. The heights of the engagement elements x and y in this range enhance the engagement effects. Furthermore, for the purpose of decreasing the adhesiveness with the protective rubber layer(s) 13, a surface treatment using a rubber releasing agent may be applied to the engagement elements x and y in the engagement element groups 12x and 12y of the two-side fastener 12.

It is desirable that a rubber material used for the protective rubber layer(s) 13 should be selected from a viewpoint that the adhesiveness of the protective rubber layer(s) 13 with the engagement elements x and y in the engagement element groups 12x and 12y of the two-side fastener 12 needs to be lower. Nitrile-butadiene rubber (NBR) can be cited as a desirable example of the rubber material. It is desirable that the modulus of the protective rubber layer(s) 13 measured when the rubber is stretched by 100% should be set in a range of 0.2 MPa to 3 MPa. If the modulus thereof measured when the rubber is stretched by 100% is less than 0.2 MPa, the protective rubber layer(s) 13 is apt to tear while the pneumatic tire is under production. On the contrary, if the modulus exceeds 3 MPa, the protective rubber layer(s) 13 is hard to be stretched in the stretch of the pneumatic tire (apt to fall off from the tire). Note that the modulus of the protective rubber layer(s) 13 should be measured by use of a No. 3 dumbbell specimen in accordance with JIS (Japanese Industrial Standards) K6251 when the rubber is stretched by 100%.

In the case where, as described above, the engagement element group(s) 12y on the second side(s) of the two-side fastener(s) 12 is used as the anchor element, it is desirable that an extremity of each engagement element y of the engagement element group (s) 12y should be formed as an enlarged portion y1 (see FIG. 3) which is not less than 0.3 mm but not more than 1 mm in width. When the width of the enlarged portion y1 is set at 0.3 mm or more, the anchor effect of the engagement element group(s) 12y can be increased. However, when the width thereof is set at 1 mm or more, the engagement element group(s) 12y is made difficult to anchor into the rubber.

The protective rubber layer(s) 13 may be formed into any shape as long as the protective rubber layer(s) 13 is capable of protecting the engagement element group(s) 12x. It is desirable that, as shown in FIG. 3, the tire meridional cross-section of the protective rubber layer(s) 13 should be shaped like a trapezoid in which a base closer to the two-side fastener 12 is longer than the other base. When the tire meridional cross-section of the protective rubber layer(s) 13 is shaped like such a trapezoid, a bladder B is likely to be brought into intimate contact with the protective rubber layer(s) 13 when the protective rubber layer(s) 13 is pressed with the bladder B. This makes it possible to prevent a curing failure from occurring due to air holes which would otherwise be formed between the bladder B and the protective rubber layer(s) 13. It is desirable that an angle θ of an acute section 13m in the cross section of the trapezoid-shaped protective rubber layer(s) 13 should be set at 45° or less from a viewpoint of an effect of checking air holes. It is desirable that the lower limit of the angle θ should be set at least 5° from a viewpoint of the manufacturing of the pneumatic tire.

Figure 24:
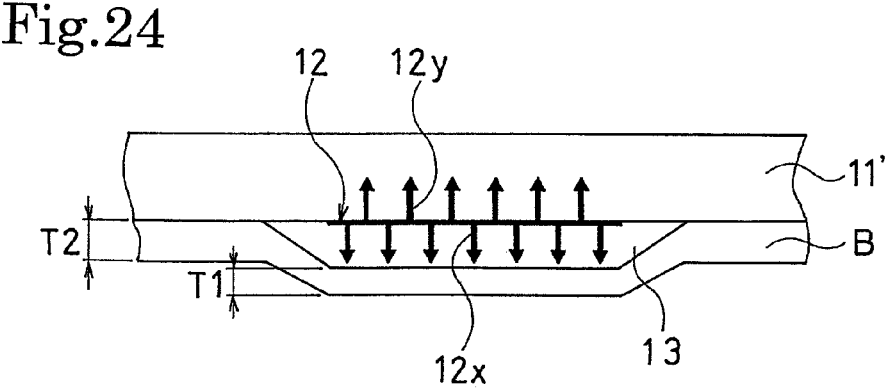
FIG. 24 is a partial cross-sectional view showing a desirable example of a bladder.

In the case where, as described above, the tire in which the two-side fastener(s) 12 is provided with the protective rubber layer(s) 13 is manufactured, as shown in FIG. 24, it is desirable to use the bladder B in which a thickness T1 of its portion corresponding to the protective rubber layer 13 is thinner than a thickness T2 of its surrounding portion. Once the protective rubber layer 13 is provided to the two-side fastener 12, heat applied to the bladder B when the green tire is cured is hard to be conducted to the inner liner layer 11' in a part of the bladder B in which the protective rubber layer 13 exists. With this phenomenon taken into consideration, the thickness T1 of the portion of the bladder B corresponding to the protective rubber layer 13 is set thinner than the thickness T2 of the surrounding portion of the bladder B. This makes it better for the heat to be conducted to the inner liner layer 11' through the part of the bladder B in which the protective rubber layer(s) 13 exist. Accordingly, it is possible to make the curing condition even throughout the green tire.

Figure 25:
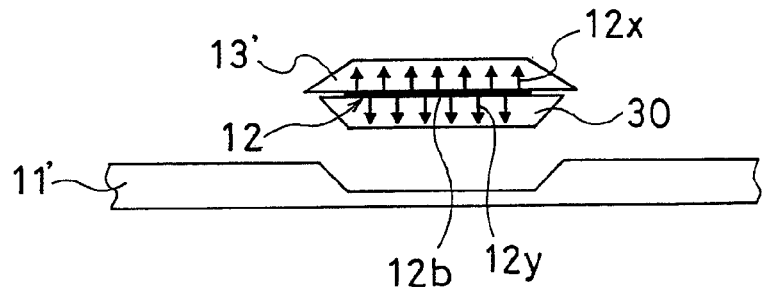
FIG. 25 is a cross-sectional explanatory view showing a case in which a rear rubber layer is used.

Like in the foregoing embodiments, it is desirable that the two-side fastener(s) 12 should be directly attached to the inner liner layer 11' from viewpoint of the weight. However, as shown in FIG. 25, a rear rubber layer 30 made of an uncured rubber which is the same as the uncured rubber constituting the inner liner layer 11' may be laid on each second side 12*b* of the two-side fastener(s) 12. In the case where the rear rubber layer 30 is provided in this manner, as shown in FIG. 25, it is desirable that the thickness of the inner liner layer 11' should be partially thin by a thickness corresponding to the thickness of the rear rubber layer 30 in a location in which the two-side fastener 12 is arranged on the inner liner layer 11'.

Figure 26:
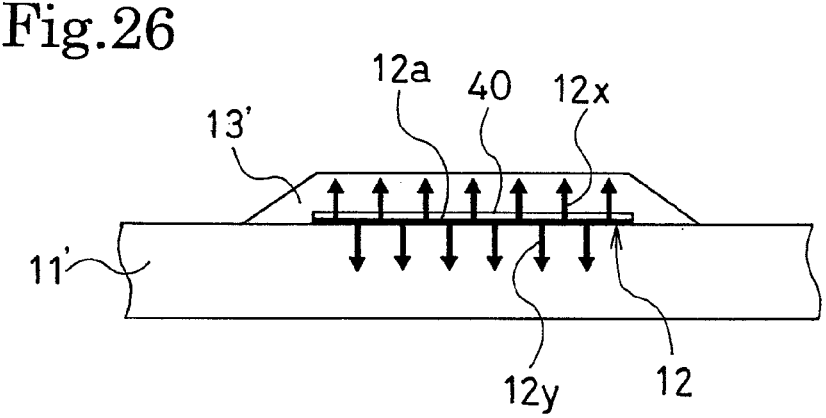
FIG. 26 is a cross-sectional explanatory view showing a case in which a rubber releasing film is used.
Figure 27:
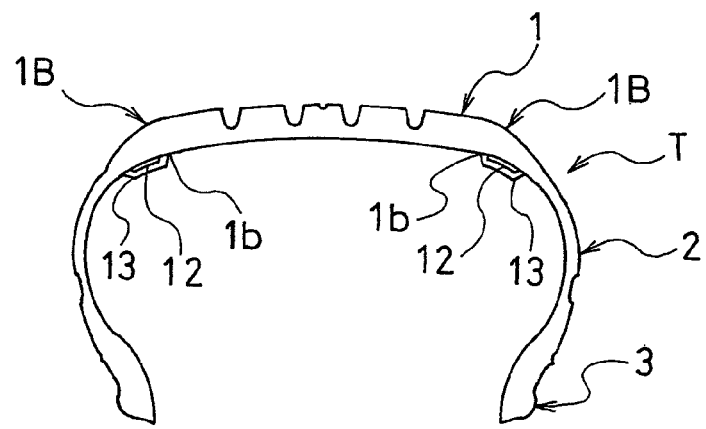
FIG. 27 is a simplistic cross-sectional view showing another example of a pneumatic tire having two-side fasteners in its tire inner surface, which is manufactured by the pneumatic tire manufacturing method according to the present invention.

The protective rubber layer(s) 13 is finally removed from the tire, because the attachment such as a noise absorbing material is attached to the engagement element group(s) 12*x* on the first side(s) 12*a* of the two-side fastener 12. For the purpose of removing the protective layer(s) 13 from the tire easily, as shown in FIG. 26, it is desirable that a rubber releasing film 40 which is easily released from the rubber should be used so that the rubber releasing film 40 is beforehand adhered to the first side(s) 12*a* of the two-side fastener(s) 12 to which the protective rubber layer(s) 13 is attached.

It is desirable that, as described above, the protective rubber layer(s) 13 should be cured before the green tire is cured from a viewpoint of enhancing the protecting effect which the protective rubber layer(s) 13 has on the engagement element group(s) 12*x* of the two-side fastener(s) 12. Instead of being cured before the green tire is cured, however, the protective rubber layer(s) 13 may be cured simultaneously when the green tire is cured.

The case in which the pneumatic tire T with the two-side fastener(s) 12 being attached to its tire inner surface 1*a* in its center portion 1A on its tread part 1 is manufactured has been shown for each foregoing embodiment. However, the manufacturing method according to the present invention is not limited to this. The manufacturing method according to the present invention may be that by which a pneumatic tire with a two-side fastener(s) 12 being attached to its tire inner surface 1*b* in each of its two shoulder parts 1B on its tread part 1.

What is claimed is:

1. A pneumatic tire manufacturing method, in making a green tire having two-side fasteners in its tire inner surface in its tire circumferential direction, each two-side fastener including an engagement element group on both sides, the method comprising the steps of:

covering the engagement element groups on first sides of the two-side fasteners with a protective rubber layer made of an uncured rubber;

making a cylindrical first formed body on a making drum, with the two-side fasteners covered with the protective rubber layer being intermittently attached to an inner circumferential surface of the first formed body in a circumferential direction thereof with the engagement element groups on second sides of the two-side fasteners being interposed in between;

bonding the first formed body to an inner circumference of an annular second formed body by compression through expanding the first formed body into a toroidal shape, and thereby making the green tire; and curing the green tire inside a mold of a curing machine while pressing the green tire from its inside by a bladder.

2. The pneumatic tire manufacturing method according to claim 1, wherein the first formed body making step comprises:

attaching the two-side fasteners onto one side of the protective rubber layer shaped like a belt at predetermined intervals in a longitudinal direction of the protective rubber layer in a way that the engagement element groups on the first sides of the two-side fasteners are buried in the protective rubber layer;

winding the protective rubber layer having the two-side fasteners around the making drum into a cylindrical shape with the two-side fasteners being located outward;

winding an inner liner layer around the cylindrical protective rubber layer having the two-side fasteners into a cylindrical shape in a way that the engagement element groups on the second sides of the two side fasteners are buried in the inner liner layer; and adhering the other tire components constituting the first formed body onto the inner liner layer.

3. The pneumatic tire manufacturing method according to claim 1, wherein the first formed body making steps comprises:

attaching the two-side fasteners onto one side of the protective rubber layer shaped like a belt at predetermined intervals in a longitudinal direction of the protective rubber layer in a way that the engagement element groups on the first sides of the two-side fasteners are buried in the protective rubber layer;

laying the protective rubber layer having the two-side fasteners on an inner liner layer in a way that the engagement element groups on the second sides of the two-side fasteners are buried in the inner liner layer;

winding a laminated body obtained by laying the protective rubber layer having the two-side fasteners on the inner liner layer around the making drum into a cylindrical shape with the protective rubber layer being located closer to the making drum; and adhering the other tire components constituting the first formed body onto the laminated body.

4. The pneumatic tire manufacturing method according to claim 1, wherein the first formed body making step comprises:

attaching a belt-shaped two-side fastener onto one side of a belt-shaped protective rubber layer in a longitudinal direction of the protective rubber layer in a way that the engagement element groups on a first side of the two-side fastener are buried in the protective rubber layer, the engagement element groups being arranged on both sides of the two-side fastener at predetermined intervals in a longitudinal direction thereof;

cutting the two-side fastener of the protective rubber layer having the two-side fastener at a location between each neighboring two of the engagement element groups;

winding the protective rubber layer having the two-side fastener thus cut around the making drum into a cylindrical shape with the two-side fastener being located outward;

winding an inner liner layer around the cylindrical protective rubber layer having the two-side fastener into a cylinder shape in a way that the engagement element groups on a second side of the two-side fastener are buried in the inner liner layer; and adhering the other tire components constituting the first formed body onto the inner liner layer.

5. The pneumatic tire manufacturing method according to claim 1, wherein the first formed body making step comprises:

attaching a belt-shaped two-side fastener onto one side of a belt-shaped protective rubber layer in a longitudinal direction of the protective rubber layer in a way that the engagement element groups on a first side of the two-side fastener are buried in the protective rubber layer, the engagement element groups being arranged on both sides of the two-side fastener at predetermined intervals in a longitudinal direction thereof;

cutting the two-side fastener of the protective rubber layer having the two-side fastener at a location between each neighboring two of the engagement element groups;

laying the protective rubber layer having the two-side fastener thus cut on an inner liner layer in a way that the engagement element groups on a second side of the two-side fastener are buried in the inner liner layer;

winding a laminated body obtained by laying the protective rubber layer having the two-side fastener thus cut on the inner liner layer around the making drum into a cylindrical shape with the protective rubber layer being located closer to the making drum; and adhering the other tire components constituting the first formed body onto the laminated body.

6. The pneumatic tire manufacturing method according to claim 1, wherein the first formed body making step comprises:

attaching a belt-shaped two-side fastener onto one side of a belt-shaped protective rubber layer in a longitudinal direction of the protective rubber layer in a way that the engagement element groups on a first side of the two-side fastener are buried in the protective rubber layer, the engagement element groups being arranged on both sides of the two-side fastener at predetermined intervals in a longitudinal direction of the two-side fastener, and the two-side fastener being provided with a cut line between each neighboring two of the engagement element groups;

winding the protective rubber layer having the two-side fastener around the making drum into a cylindrical shape with the two-side fastener being located outward;

winding an inner liner layer around the cylindrical protective rubber layer having the two-side fastener into a cylindrical shape in a way that the engagement element groups on a second side of the two-side fastener are buried in the inner liner layer; and adhering the other tire components constituting the first formed body onto the inner liner layer.

7. The pneumatic tire manufacturing method according to claim 1, wherein the first formed body making step comprises:

attaching a belt-shaped two-side fastener onto one side of a belt-shaped protective rubber layer in a longitudinal direction of the protective rubber layer in a way that the engagement element groups on a first side of the two-side fastener are buried in the protective rubber layer, the engagement element groups being arranged on both sides of the two-side fastener at predetermined intervals in a longitudinal direction of the two-side fastener, and the two-side fastener being provided with a cut line between each neighboring two of the engagement element groups;

laying the protective rubber layer having the two-side fastener on an inner liner layer in a way that the engagement element groups on a second side of the two-side fastener are buried in the inner liner layer;

winding a laminated body obtained by laying the protective rubber layer having the two-side fastener on the inner liner layer around the making drum into a cylindrical shape with the protective rubber layer being located closer to the making drum; and adhering the other tire components constituting the first formed body onto the laminated body.

8. The pneumatic tire manufacturing method according to claim 1, wherein the first formed body making step comprises:

covering the engagement element groups on a first side of a belt-shaped two-side fastener with the protective rubber layer made of the uncured rubber, the engagement element groups being arranged on both sides of the two-side fastener at predetermined intervals in a longitudinal direction of the two-side fastener;

laying the belt-shaped two-side fastener covered with the protective rubber layer on an inner liner layer in a way that the engagement element groups on a second side of the two-side fastener are buried in the inner liner layer with a part of the two-side fastener being folded between each neighboring two of the engagement element groups;

winding a laminated body obtained by laying the two-side fastener covered with the protective rubber layer on the inner liner layer around the making drum into a cylindrical shape with the two-side fastener being located closer to the making drum; and adhering the other tire components constituting the first formed body onto the laminated body.

9. The pneumatic tire manufacturing method according to any one of claims 1 to 8, wherein the protective rubber layer made of the uncured rubber is cured before the green tire is cured.

10. The pneumatic tire manufacturing method according to claim 1, wherein the first formed body making step comprises:

attaching a belt-shaped two-side fastener onto one side of a belt-shaped protective rubber layer in a longitudinal direction of the protective rubber layer in a way that the engagement element groups on a first side of the two-side fastener are buried in the protective rubber layer, the engagement element groups being provided onto both sides of the two-side fastener;

curing the protective rubber layer having the two-side fastener while forming the protective rubber layer into a meandering shape in a thickness direction thereof;

attaching the thus-cured and formed protective rubber layer having the two-side fastener to an inner liner layer in a way that the engagement element groups on a second side of the two-side fastener are intermittently buried in the inner liner layer;

winding a complex around the making drum into a cylindrical shape with the protective rubber layer being located closer to the making drum, the complex obtained by attaching the protective rubber layer having the two-side fastener thus formed to the inner liner layer; and adhering the other tire components constituting the first formed body onto the complex.

11. The pneumatic tire manufacturing method according to claim 1, wherein the first formed body making step comprises:

attaching a belt-shaped two-side fastener onto one side of a belt-shaped protective rubber layer in a longitudinal direction of the protective rubber layer in a way that the engagement element groups on a first side of the two-side fastener are buried in the protective rubber layer, the engagement element groups being provided on both sides of the two-side fastener;

curing the protective rubber layer having the two-side fastener while forming the protective rubber layer into a meandering shape in a thickness direction thereof;

winding the thus-cured and formed protective rubber layer having the two-side fastener around the making drum into a cylindrical shape with the protective rubber layer being located closer to the making drum while keeping the protective rubber layer having the two-side fastener formed into the meandering shape;

winding an inner liner layer around the thus-formed cylindrical protective rubber layer having the two-side fastener into a cylindrical shape in a way that the engagement element groups on a second side of the two-side fastener are intermittently buried in the inner liner layer; and adhering the other tire components constituting the first formed body onto the inner liner layer.

12. The pneumatic tire manufacturing method according to claim 1, wherein the first formed body making step comprises:

attaching the two-side fasteners respectively onto first sides of a plurality of protective rubber layers in a way that the engagement element groups on a first side of each two-side fastener are buried in a corresponding one of the protective rubber layers, the engagement element groups being provided on both sides of each two-side fastener;

curing the protective rubber layers having the two-side fasteners while forming the protective rubber layers into a meandering shape in thickness directions thereof;

attaching the thus-cured and formed protective rubber layers having the two-side fasteners to an inner liner layer at predetermined intervals in a longitudinal direction of the inner liner layer in a way that the engagement element groups on a second side of each two-side fastener are intermittently buried in the inner liner layer;

winding a complex around the making drum into a cylindrical shape with the protective rubber layers being located closer to the making drum, the complex being obtained by attaching the thus-formed protective rubber layers having the two-side fasteners to the inner liner layer; and adhering the other tire components constituting the first formed body onto the complex.

13. The pneumatic tire manufacturing method according to any one of claims 1 to 8 and 10 to 12, wherein a modulus measured when the rubber of the protective rubber layer or the protective rubber layers is stretched by 100% is 0.2 MPa to 3 MPa.

14. The pneumatic tire manufacturing method according to any one of claims 1 to 8 and 10 to 12, wherein the protective rubber layer or the protective rubber layers are removed after the green tire is cured.

* * * * *